March 5, 1963 W. H. LYON 3,080,169

MAGNETIC TAPE CHANNEL-LOADING DICTATING MACHINE

Filed July 1, 1954 4 Sheets-Sheet 1

INVENTOR.
WILLIAM H. LYON
BY
H. G. Manning
ATTORNEY

March 5, 1963 W. H. LYON 3,080,169

MAGNETIC TAPE CHANNEL-LOADING DICTATING MACHINE

Filed July 1, 1954 4 Sheets-Sheet 2

INVENTOR.
WILLIAM H. LYON
BY
H. G. Manning
ATTORNEY

March 5, 1963 W. H. LYON 3,080,169

MAGNETIC TAPE CHANNEL-LOADING DICTATING MACHINE

Filed July 1, 1954 4 Sheets-Sheet 3

INVENTOR.
WILLIAM H. LYON
BY
H. G. Manning
ATTORNEY

March 5, 1963 W. H. LYON 3,080,169

MAGNETIC TAPE CHANNEL-LOADING DICTATING MACHINE

Filed July 1, 1954 4 Sheets-Sheet 4

INVENTOR.

WILLIAM H. LYON

BY H. G. Manning

ATTORNEY

United States Patent Office
3,080,169
Patented Mar. 5, 1963

3,080,169
MAGNETIC TAPE CHANNEL-LOADING DICTATING MACHINE

William H. Lyon, Orange, Conn., assignor to The Soundscriber Corporation, New Haven, Conn., a corporation of Connecticut Filed July 1, 1954, Ser. No. 440,749
7 Claims. (Cl. 274—11)

This invention relates to sound recording and reproducing apparatus, and more particularly to a dictating machine in which the sound is recorded upon and reproduced from a wide, slowly moving flexible strip of tape coated on its lower side with an emulsion of magnetic particles.

One object of the present invention is to provide a sound recording and reproducing apparatus of the above nature wherein a series of successive interrupted straight sound tracks may be impressed laterally across the moving tape by means of a plurality of electromagnetic transducer heads carried on a cylindrical drum, slowly rotating on a horizontal axis beneath said tape and in contact therewith.

A further object is to provide an apparatus of the above nature in which a recorded section of the tape may be cut off for transcription, filing or mailing.

A further object is to provide an apparatus of the above nature in which the magnetic tape may be adjusted forwardly and backwardly into operating position by means of a single manual control knob, whenever it is desired to play back or transcribe the material recorded thereon.

A further object is to provide a magnetic tape recording apparatus of the above nature in which the tape may be readily loaded by pushing it through a channel-shaped trough with a single straight line motion, without winding or sinuous threading.

A further object is to provide an apparatus of the above nature having a manually operated index stylus for marking corrections and the location of ends of letters upon the top of the slowly moving magnetic tape.

A further object is to provide an apparatus of the above nature which will be simple in construction, inexpensive to manufacture, easy to install and manipulate, compact, ornamental in appearance and very efficient and durable in use.

With these and other objects in view, there has been illustrated on the accompanying drawings one form in which the invention may conveniently be embodied in practice.

Figure 1:
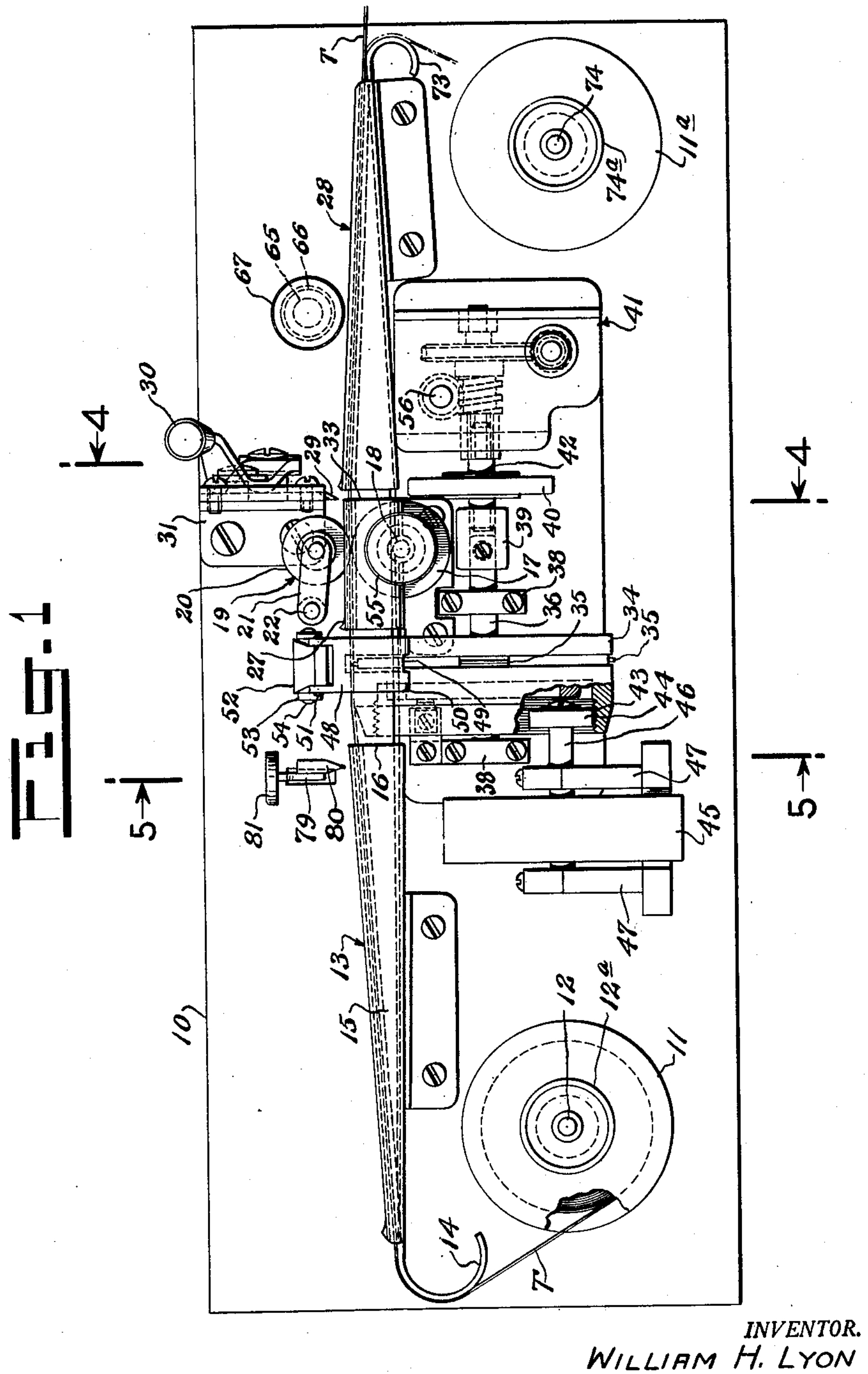
FIG. 1 represents a side view of the magnetic tape dictating apparatus.

The magnetic dictating apparatus herein disclosed is designed to record with maximum efficiency on a low cost magnetically-coated flexible tape. A large roll of such tape capable of recording for many hours will preferably be employed, so that the apparatus will always be ready for short or long periods of recording. Moreover, when a section of the tape has been recorded, it may be pulled forward by manually turning a knob, and the recorded section cut off from the roll of tape with an in-built knife. The section of tape which has been cut off and which contains the recorded sound may then be either transcribed immediately on the same or a similar machine, filed away for future reference, or dispatched to other persons as a verbal memorandum.

The magnetic tape is adapted to be recorded transversely in a series of successive sound tracks by a slowly rotating drum mounted on a horizontal shaft and containing a plurality of equally spaced transducer heads which record sound tracks laterally entirely across the tape in successive straight lines. An apparatus of this general type was disclosed in my copending application, Serial Number 406,517, filed January 27, 1954, now Patent No. 2,845,495, granted July 29, 1958, and entitled "Long Playing Tape Recording Apparatus."

By rotating the head drum slowly by a constant speed motor, and by designing the apparatus for the minimum track width, spacing between the tracks, and speed of rotation of the head drum the tape consumption may be held quite low. In this manner, an average business letter will often require only 5 to 10 inches of tape, which may be discarded as "expendable" after being transcribed.

As herein disclosed the drum is provided with four uniformly spaced transducer heads which project beyond the outer rim of said drum and trace tracks on the under surface of and at right angles to said tape.

It will be understood that with this apparatus, when a head is just leaving the rear edge of the tape, the next successive head will just be arriving at the front edge of said tape. Moreover, by means of a concave holding shoe, the tape will be curved to closely embrace the tips of the transducer heads on the cylindrical drum.

Referring now to the drawings, in which like reference numerals denote corresponding parts throughout the several views, the numeral 10 indicates a main chassis plate upon which is mounted a tape supply feed reel 11 having a horizontal spindle 12 which is provided with a front hand knob 12*a*.

The magnetically coated tape T will pass from the feed reel 11 around a smooth downwardly curled entrance section 14 of an elongated guide channel or trough 13 having upwardly and inwardly extending side flanges 15 which embrace the edges of the tape T.

As the tape moves through said channel 13, the curvature thereof will gradually be increased in such a manner that by the time the tape T has reached the inner end 16 of the channel, it will have a curvature corresponding with the outer circumference of a slowly rotating cylindrical drum 34, which is mounted on a horizontal axis and provided with a plurality of uniformly spaced transducer heads 35 which serve to generate the successive sound tracks upon the tape T.

The tape T then passes over the head drum 34, being held in contact therewith by a concave pressure shoe 48 located above it. The tape T then moves through a center guide channel 27 of uniform curvature and thence over a feed roller 17 which projects up through the channel 27—said roller 17 having a narrow rim which contacts with the curved tape T only in the top central portion thereof.

The feed roller 17 is supported upon a horizontal shaft 18 provided on its front end with a hand knob 55, the tape T being held in firm contact with said feed roller 17 by a pressure roller 19 which has a rubber tire 20 on the circumference thereof. The pressure roller 19 is mounted on an arm 21 which is pivoted on a shaft 22 mounted in a bearing 23 rigid with the chassis plate 10.

The shaft 22 of the pressure arm 21 projects to the rear of the chassis 10 and carries an arm 24 which is connected with a coiled spring 25 anchored to a horizontal pin 26 on said chassis, said spring 25 serving to exert constant pressure on the roller 19.

The tape T then passes over a flat angular shearing edge 33 on the end of the channel 27 and enters a final exit concave guide channel 28, which has a gradually decreasing curvature so that the tape will become totally flat when it reaches an end channel curl 73.

In order to shear the tape T from the supply roll on the reel 11 after a unit of recording has been completed, provision is made of a tape cutting knife 29 which may manually be swung down against the shearing edge 33 on the channel 27 by means of a handle 30 on the end of the knife 29. The knife 29 is pivoted on a pin 32 secured to a vertical bracket 31 on the chassis 10.

The head drum 34 is mounted on a longitudinal shaft 36 which is supported by a pair of bearings 37, carried by a pair of horizontal brackets 38 extending forwardly from the chassis plate 10.

The drum shaft 36 is provided with an adaptor 39 for attaching it to a flexible coupling 40, which in turn is secured to a longitudinal drive shaft 42 mounted in a gear box 41. The shaft 42 is driven by means of a worm and worm gear through a rear coupling 72 and a transverse shaft 71 of a motor M located behind the chassis plate 10 and mounted on a bracket 78.

Figure 5:
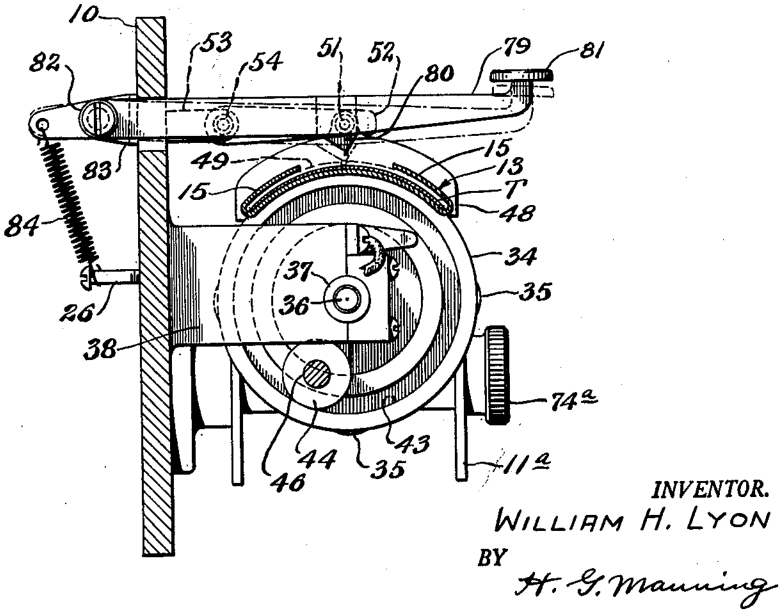
FIG. 5 is a cross-sectional view of the same, taken along the line 5—5 of FIG. 1.

On the inside of the head drum 34, provision is made of a circular raceway 43 (FIGS. 1 and 5) which is designed to cooperate with a small rubber wheel 44 mounted on a shaft 46 which is provided with a stabilizing flywheel 45 to reduce "flutter" from the gearing. A vertical duplex bracket 47, rigidly mounted on the chassis plate 10, serves to support the flywheel shaft 46.

The arcuate pressure shoe 48 is mounted at its center on a pivot pin 51 carried on the front end of a supporting arm 52, which is pivoted at its rear end by a pivot pin 54 to a horizontal bracket 53 mounted on the chassis plate 10. The concave bottom surface of the tape pressure shoe 48 causes the tape T to conform accurately to the outer circumference of the head drum 34.

Running along the concave portion of the tape pressure shoe 48 is a curved central sound track groove 49 which permits the transducer heads 35 on the drum 34 to flex the tape T slightly upwardly into said groove during the recording and reproducing processes and thus holds said tape resiliently against said heads.

The forward edge 50 of the concave portion of the pressure shoe 48 adjacent the incoming tape T is smoothly beveled to permit the tape to be manually pushed easily from the guide trough 13 under the pressure shoe 48, after which it will pass into the center guide channel 27 and be picked up by the feed roller 17 and pressure roller 19.

Figure 2:
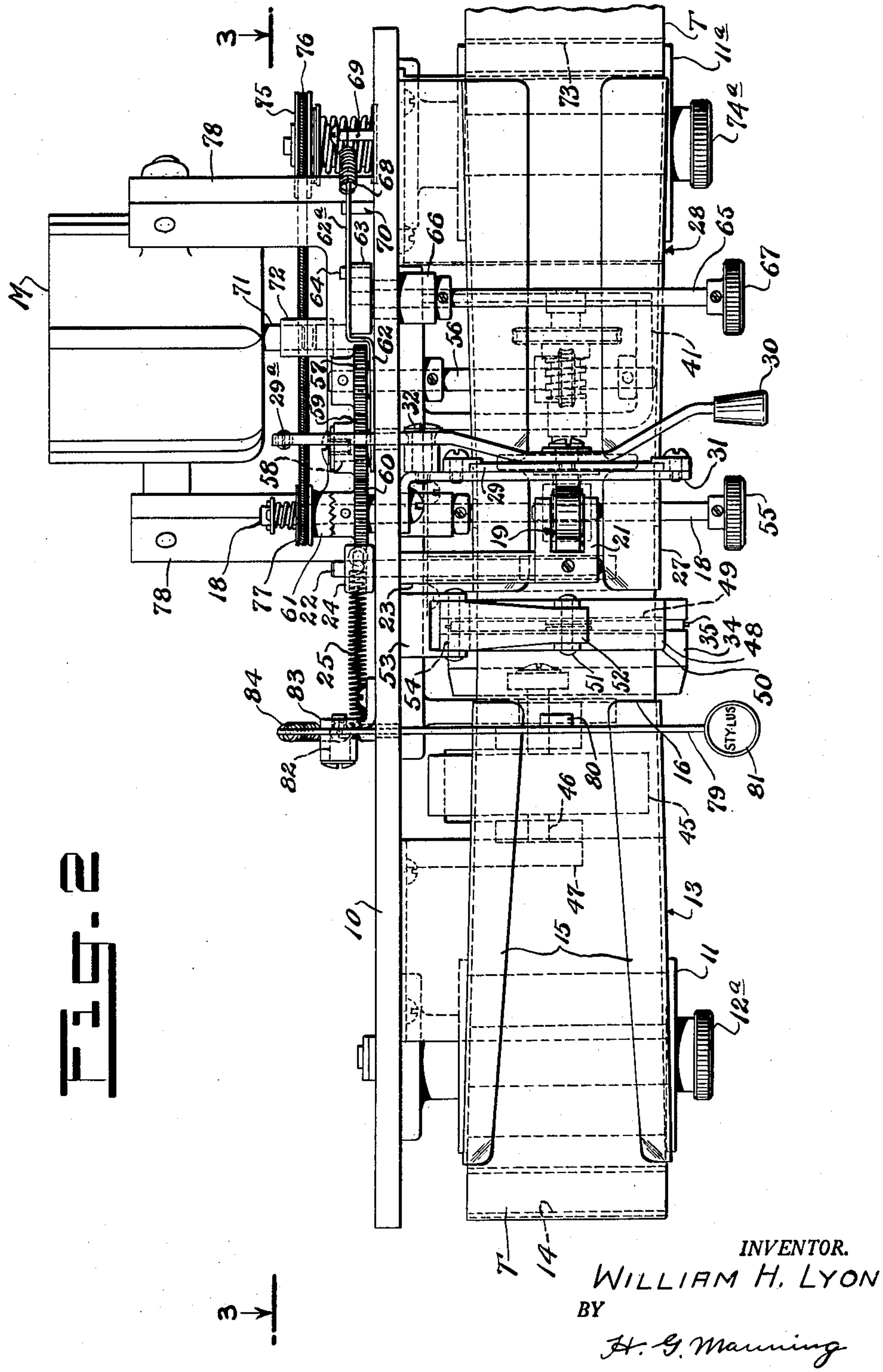
FIG. 2 is a top plan view of the same.

A shaft 56 in the gear box 41 (FIG. 3) is fitted with a spur gear 57 which drives an idler gear 59, which in turn rotates a feed roller gear 60, the latter driving the feed roller 17 through a toothed clutch 61 (FIG. 2) on the shaft 18.

Figure 3:
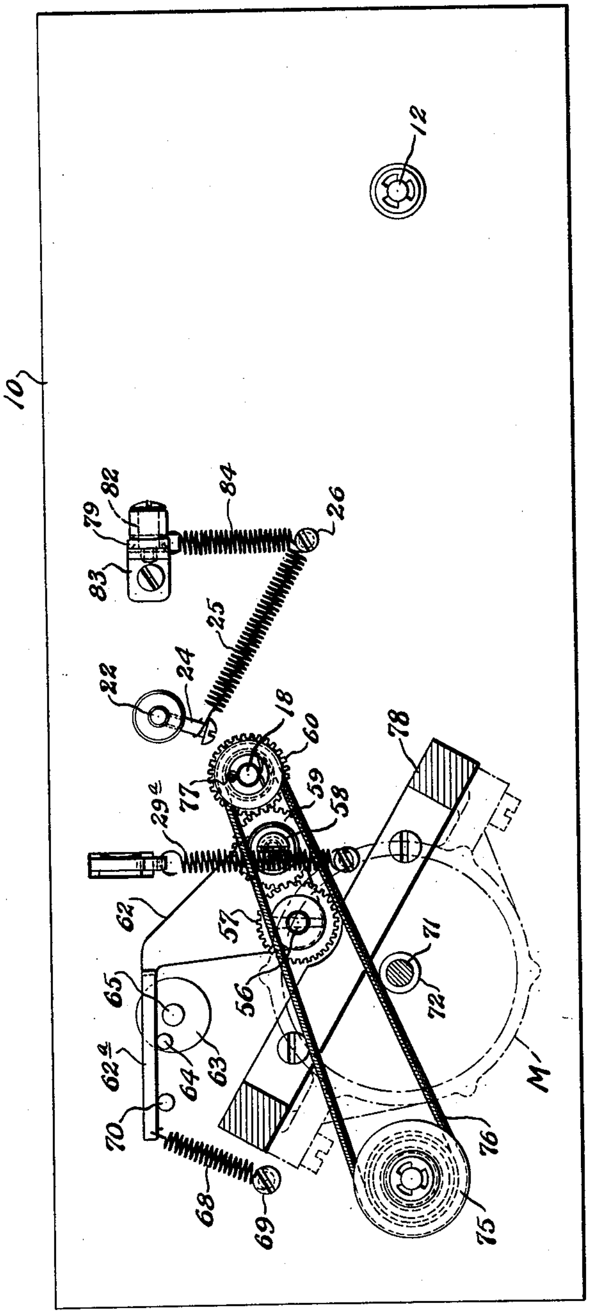
FIG. 3 is a longitudinal sectional view of the same, taken along the line 3—3 of FIG. 2, looking in the direction of the arrows.
Figure 4:
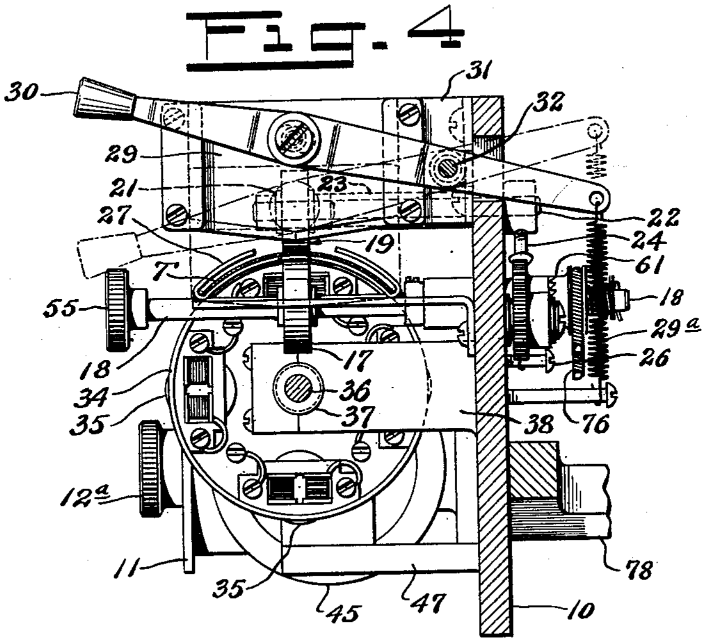
FIG. 4 is a cross-sectional view of the same, taken along the line 4—4 of FIG. 1.

The idler gear 59 is mounted on a spindle 58 which in turn is carried by a triangular adjustable plate 62 pivoted on the shaft 56 and adapted to be rocked manually slightly by a pin 64 carried by a rotating wheel 63 to vary the position of the idler gear 59 with respect to the gears 57 and 60 (FIG. 3). This rotatable wheel 63 permits the operator easily to align the heads with the recorded tracks during playback.

The wheel 63 is mounted on a shaft 65 supported in a bearing 66 which is rigidly secured to the chassis 10.

The shaft 65 is equipped with a front handle knob 67 by means of which the wheel 63 and its operating pin 64 may be turned manually. A side arm 62*a* extending from the adjustable plate 62 rests against a stop pin 70 when the wheel 63 is not being used, and said plate 62 is held firmly against the stop 70 by means of a coil spring 68, which is secured to an anchor pin 69 on the chassis plate 10.

By swinging the adjustable plate 62, the angular relationship of the feed roller 17 with respect to the head drum 34 may be slightly varied. In this manner, the section of the tape to be reproduced can manually be shifted longitudinally slightly with respect to the transducer heads 35 to insure accurate alignment of said heads with the recorded sound tracks on the tape.

It will be understood that the clutch 61 attached to the feed roller drive shaft 18 may be overdriven by means of the knob 55. This permits the feed roller 17 to be turned manually forward and backward at will, without disengaging the gears of the driving train.

In recording, the feer roller knob 55 may be used not only to advance the tape T, but also to step back the tape slightly to permit listening to the last part of the recording for a quick review.

The knob 55 may also be used to turn the tape back for repeats, to advance the tape rapidly over parts that are not needed, or for scanning the tape back and forth rapidly to find some desired portion of the recorded track.

In order to make it unnecessary for resynchronizing or readjustment of the alignment between the tape T and the transducer heads 35, the toothed clutch 61 is so designed that the distances between the clutch holding teeth and the track spacing for the feed roller 17 are exact multiples. Thus, for example, if the tape is backed up four spaces on the clutch 61, the number of tracks moved back will be exactly four or a multiple of four.

If the machine is to be used for making very long recordings, such as thirty minutes or more, a take-up spool 11*a* may be attached at the right-hand end of the chassis plate 10 for winding up the long lengths of magnetic tape involved.

In such a case, a hand knob 74*a* on a shaft 74 will be employed to rapidly wind the tape forward.

If desired, the take-up shaft 74 may be provided with a pulley 75 (FIG. 2), located behind the chassis plate 10, and a spring belt 76 passing over said pulley 75 is driven by a pulley 77 on the feed shaft 18.

In order to produce indicating marks on the top of the tape, provision is made of an arm 79 carrying a pointed indexing marking stylus 80, preferably of graphite, at an intermediate point thereon, said arm 79 having at its front end a button 81 marked "stylus," said arm 79 being pivoted at its rear end by a pin 82 to a bracket 83. The arm 79 is urged upwardly by a coil spring 84 connected to the anchor pin 26.

One advantage of this improved dictating apparatus is that short lengths of recorded tape which have been cut from the supply may be quickly and instantly reproduced or transcribed merely by pushing said sections into the guide channel 13 without the necessity of employing threading leaders or other complicated apparatus.

*Operation*

In loading the tape T, it will first be passed around the curled section 14 at the entrance of the guide channel 13. It will then be pushed through said channel, over the head drum 34 and under the tape guiding shoe 48 and into the center guide channel 27.

To use the apparatus for playback, a short piece of tape T which has been cut off may be pushed into the trough or channel 13 manually in a straight line, until it is gripped by the feed mechanism. The tape T may then be moved forward or backward as desired by manipulating the manual feed roller knob 55.

While there has been described in this specification one form in which the invention may be embodied, it is understood that this form is shown for the purpose of illustration only, and that the invention is not limited to the specific disclosure but may be modified and embodied in various other forms without departing from its spirit. In short, the invention includes all the modifications and embodiments coming within the scope of the following claims.

Having thus fully described the invention what is claimed as new and for which it desired to secure Letters Patent is:

1. In apparatus for magnetically recording on and reproducing from a longitudinally movable, flexible, magnetically coated relatively wide tape, a chassis, a feed reel for said tape mounted at one end of said chassis, a tape-up reel mounted at the other end of said chassis, tape driving means for moving said tape from an entrance position to an exit position on said chassis, a continuously rotating circular drum having equally spaced transducer heads located around the periphery thereof to scan said tape along successive transverse arcuate paths, said heads lying in a plane intersecting the plane of said tape, hollow guide channel means to support said tape in a straight path from said feed reel to one side of said transducing drum, said channel means having a longitudinal convex surface of gradually increasing cross-sectional curvature along which said tape is guided in face-to-face relative disposition from its entrance end to said drum and being provided with marginal flanges to prevent lateral displacement of said tape, said tape driving means comprising a narrow rotating feed roller frictionally engaging one side of said tape at the other side of and close to said drum, a pressure roller located at the opposite side of said tape for maintaining constant contact between said tape and said feed roller, said tape driving means further comprising slip drive means for rotating said tape-up reel at a speed always sufficient for respooling tape driven by said feed roller.

2. The invention as defined in claim 1, including a second guide channel means provided with a gradually decreasing cross-sectional curvature from said feed roller to said take-up reel for guiding said tape to said take-up reel for respooling.

3. In an apparatus for recording intelligence upon and reproducing it from a movable, flexible, magnetically coated relatively wide tape, a chassis, a feed reel, a take-up reel, tape driving means for moving said tape from said feed reel to said take-up reel, a continuously rotating drum having equally spaced transducer heads projecting from its periphery mounted to scan tape along successive transverse arcuate paths, said heads lying in a plane intersecting the plane of said tape, tape guiding means comprising an elongated entrance channel having a longitudinally convex surface of progressively increasing cross-sectional curvature along which said tape is guided in face-to-face relative disposition from said feed reel to said drum, a center guide channel of constant cross-sectional curvature and an elongated exit channel means having a longitudinal convex surface of progressively decreasing cross-sectional curvature along which said tape is guided in face-to-face relative disposition from said center guide channel to said take-up reel, said guide means including flange means to enclose one edge of said tape to prevent lateral displacement thereof, said tape driving means comprising a narrow, rotating feed roller frictionally engaging the underside of said tape through an opening in said center guide channel at a position close to said drum, and a pressure roller located at the opposite side of said tape for maintaining constant contact between said tape and said feed roller, said tape driving means further comprising slip drive means for rotating said take-up reel at a speed always sufficient for respooling tape driven by said feed roller.

4. The invention as defined in claim 3, including means for laterally severing said tape at the exit end of said center guide channel means, comprising a slidably mounted V-shaped shearing knife adapted to be moved down against the tape for cutting the tape progressively to each side from the center as said knife is moved down against the exit end of said center guide channel means.

5. In an apparatus for recording intelligence upon and reproducing it from a longitudinally movable, flexible, magnetically-coated relatively wide tape, a chassis carrying a feed reel and a take-up reel, tape driving means for moving said tape from said feed reel to said take-up reel, a continuously rotating drum having spaced apart transducer heads projecting from the periphery thereof to scan said tape along successive transverse arcuate paths lying in a plane intersecting the plane of said tape, means to maintain said tape transversely curved during movement adjacent said drum, a narrow feed roller to frictionally engage one side of said transversely curved tape at a position close to said drum, a pressure roller located on the opposite side of said tape for maintaining constant contact between said tape and said feed roller, said tape driving means comprising means for positively driving said feed roller, said means to maintain said tape transversely curved comprising a longitudinal guide channel having a convex guide surface of increasing cross-sectional curvature in the direction of said tape, said tape driving means further comprising slip drive means for rotating said take-up reel at a speed always sufficient for respooling tape driven by said feed roller.

6. The invention as defined in claim 5, wherein said pressure roller is provided with a rubber tire for engaging the upper surface of said tape.

7. In an apparatus for recording intelligence upon and reproducing it from a longitudinally movable, relatively wide, flexible, magnetically coated tape having parallel transversely recorded tracks, a chassis, a feed reel, a take-up reel, tape driving means for moving said tape from said feed reel to said take-up reel, a continuously rotatable drum carrying a plurality of peripherally-spaced transducer heads mounted on an axis generally parallel to the direction of movement of said tape, a concave pressure shoe pivotally mounted upon said chassis for exerting pressure upon said tape to force it into contact with said transducer heads, transversely-curved elongated guide channel means to transfer said tape from said feed reel to said pressure shoe in a straight path, said guide channel means comprising a longitudinal convex surface of progressively increasing cross-sectional curvature from said feed reel to said pressure shoe, said tape driving means comprising a narrow, rotating feed roller frictionally engaging one side of said tape at a position close to said drum, a pressure roller located at the opposite side of said tape for maintaining constant contact between said tape and said feed roller, said tape driving means further comprising slip drive means for rotating said take-up reel at a speed always sufficient for respooling tape driven by said feed roller.

References Cited in the file of this patent

UNITED STATES PATENTS

| | | |
|---|---|---|
| 1,707,243 | Wildhaber | Apr. 2, 1929 |
| 1,909,504 | Robbins | May 16, 1933 |
| 2,095,750 | Kiel | Oct. 12, 1937 |
| 2,127,331 | Fulton | Aug. 16, 1938 |
| 2,175,959 | Goldstein | Oct. 10, 1939 |
| 2,245,286 | Marzocchi | June 10, 1941 |
| 2,343,114 | Neumann | Feb. 29, 1944 |
| 2,352,023 | Schuller | June 20, 1944 |
| 2,419,682 | Guillemin | Apr. 29, 1947 |
| 2,428,742 | Rothe | Oct. 7, 1947 |
| 2,497,142 | Shepherd | Feb. 14, 1950 |
| 2,606,093 | Reason | Aug. 5, 1952 |
| 2,608,357 | Brearton | Aug. 26, 1952 |
| 2,744,755 | Dibbins | May 8, 1956 |
| 2,745,711 | Schweitzer | May 15, 1956 |
| 2,750,449 | Thompson | June 12, 1956 |

FOREIGN PATENTS

| | | |
|---|---|---|
| 899,195 | France | May 23, 1945 |